United States Patent
Dragoset, Jr. et al.

[11] Patent Number: 5,442,591
[45] Date of Patent: Aug. 15, 1995

[54] METHOD FOR ADAPTIVELY SUPPRESSING NOISE TRANSIENTS IN SUMMED CO-SENSOR SEISMIC RECORDINGS

[75] Inventors: William H. Dragoset, Jr.; Ronald E. Chambers, both of Houston, Tex.

[73] Assignee: Western Atlas International, Houston, Tex.

[21] Appl. No.: 263,056

[22] Filed: Jun. 21, 1994

[51] Int. Cl.$^6$ .............................................. G01V 1/38
[52] U.S. Cl. ..................................... 367/21; 367/22; 364/421; 181/110
[58] Field of Search .................... 367/21, 22; 364/421; 181/110

[56] References Cited

U.S. PATENT DOCUMENTS

| | | | |
|---|---|---|---|
| 4,344,158 | 8/1982 | Landrum et al. | 367/73 |
| 4,937,794 | 6/1990 | Marschall et al. | 367/21 |
| 5,293,352 | 3/1994 | Chambers | 367/38 |
| 5,365,492 | 11/1994 | Dragoset | 367/21 |

OTHER PUBLICATIONS

Dragoset et al, 64th Annu. SEG Int. Octg. Oct. 23, 1994, pp. 857–860, CPAP No. SAI2.

*Primary Examiner*—Nelson Moskowitz
*Attorney, Agent, or Firm*—William A. Knox

[57] ABSTRACT

Seismic data from co-located sensors of different genera are formatted into common velocity-receiver gathers and common pressure receiver gathers. A first ratio between the velocity signature amplitudes and the pressure signature amplitudes is measured within a fixed analysis window. A second ratio is measured between the pressure and velocity signatures for a weighting-zone window of limited extent. The first and second ratios are combined to form an equalization operator. The pressure and velocity signatures from within the weighting zone window are combined in the presence of the equalization operator to define a transient-free time-scale datum.

6 Claims, 4 Drawing Sheets

METHOD FOR ADAPTIVELY SUPPRESSING NOISE TRANSIENTS IN SUMMED CO-SENSOR SEISMIC RECORDINGS

BACKGROUND OF THE INVENTION

1. Field of the Invention

An improved method for processing shallow-water marine seismic data that has been contaminated by noise transients such as environmental noise generated by shrimp, croaker fish, whales and the like.

2. Description of Related Art

During the course of a marine seismic survey, a long string of several hundred seismic sensors is towed through the water by means of a suitable cable. Periodically, such as every six to eight seconds, an acoustic source is triggered to emit a wavefield to insonify the subsurface earth layers thereby to generate a reflected acoustic wavefield that is detected by the sensors. The detected mechanical signals representative of the reflected wavefield are converted to electrical signals by the sensors. The electrical signals are transmitted through conductors in the cable to the towing ship where the signals are recorded for future analysis to display the topography of the subsurface earth layers. The seismic signals from each source-triggering are digitized and recorded in the form of a set including a plurality of discrete time series, one time series corresponding to each sensor or sensor group connected to the cable. The set of discrete time series resulting from each source-triggering may be displayed as a single multi-trace visual seismic record. The traces may take the form of variable amplitude or variable density or variably colored traces.

In shallow water at depths on the order of 20–250 feet, so-called bay cables are used. For certain technical reasons, a typical bay cable includes co-located sensor pairs of different genera. Usually a pressure sensor is paired with a gimbal-mounted particle-velocity sensor, both of which sensors are customarily laid directly on the sea floor. Shallow water operations are so well known and routine to those skilled in the art of geophysical exploration that a prolix explanation and accompanying illustrations should not be needed.

Any unwanted wavefield that appears on a seismic record is considered to be noise. Many different sources create the noises that afflict the seismic signals received during the course of a shallow-water marine survey. Whereas whale-talk is bothersome noise to the geophysicist, it may be music to the ears of an environmentalist.

Reverberation due to acoustic signals bouncing between the sea floor and the water surface seriously distorts the desired reflected wavefields. Various methods are known for eliminating such contamination such as U.S. patent application Ser. No. 08/101,949, now U.S. Pat. No. 5,365,492, issued Nov. 15, 1991 to W. H. Dragoset and assigned to the assignee of this invention. That patent describes a method for scaling the outputs from sensors of different genera relative to each other. Additionally, an adaptive noise cancellation process was taught for reducing the noise content of the respective signals prior to summation.

Seismic shots generated by a rival seismic crew produces coherent noise. U.S. Pat. No. 4,937,794, issued Jun. 26, 1990 to R. A. Marschall et al. explains how coherent noise on seismic records may be suppressed by formatting the common shot gathers to common receiver gathers. Pairs of seismic traces from a common receiver gather are corrected for differential normal moveout, weighted in inverse proportion to the RMS signal power, and combined to generate compressed common receiver gathers. The compressed common receiver gathers may be reformatted as common midpoint gathers for further processing.

Noise due to near-surface scatterers may be removed or minimized in accordance with the teachings of U.S. Pat. No. 5,293,352, issued Mar. 8, 1994 to Ronald E. Chambers and assigned to the assignee of this invention. Therein it is taught that a set of raw common shot gathers are resorted to common receiver gathers. The wavefield envelopes from the common receiver gathers are migrated using one-half the near-surface velocity to provide migrated data sets. The migrated data sets are resorted back into common shot gathers and subtracted from the original raw common shot gathers to provide coherent-noise reduced data sets.

A method that was designed originally for use with vibroseis data on land but one that could be adapted for use in shallow marine projects explains that a reference model of the level of a valid seismic signal is built for each of a number of time windows during a seismic data recording cycle. The model is selected by obtaining the average of the absolute magnitudes for each time window from a number of sweeps to form a set of averages. The median of each set is selected and is padded by a suitable coefficient to provide the reference model for each time window. Subsequently a recording is made. Each data sample from the recording is compared to the reference model corresponding to the time window that includes the sample. If the amplitude level of the data sample exceeds the reference model level, the sample is suppressed prior to summing. See U.S. Pat. No. 4,344,158, issued Aug. 10, 1982 to Ralph A. Landrum, assigned to the assignee of this invention.

A particularly troublesome type of noise, that is not easily handled by known methods, is biological. FIG. 1 illustrates an example of such noise which is believed to have been due to a Grand Bétail or to croaker or similar fish. The noise bursts are the inverted arrow-like diffraction patterns such as 10. The desired wavefields are the broad gently-curved hyperbolic waveforms generally indicated by 12.

There is a need for a noise-abatement technique for attacking unwanted singular transients.

SUMMARY OF THE INVENTION

A method for adaptively suppressing undesired singular transients from time scale recordings of seismic signals that are detected concurrently by a plurality of velocity-responsive and pressure-responsive co-located co-sensors. A reflected wavefield is generated in a moisture-laden environment, the wavefield being detected by the respective co-sensors to provide velocity and pressure time-scale signatures. Within a fixed analysis window a scale factor, k, is iteratively defined for scaling the velocity signatures to the amplitude of the pressure signatures. The signatures from the pressure-responsive sensors are grouped to form a first common pressure-receiver gather. The detected velocity-responsive signatures are grouped to form a second, common velocity-receiver gather. A ratio $R_1$ is defined between the second and the first gathers. The respective common receiver gathers are partitioned into a plurality of weighting zones. Within a first weighting zone, a ratio $R_2$ is defined between the pressure signatures and the velocity signatures within that zone. The ratios $R_1$ and $R_2$ are combined to form equalization operator. A transient-free time-scale datum is defined by combining the data in the common pressure-receiver weighting zone with the scaled data in the common velocity-receiver weighting zone in the presence of the equalization operator.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

This invention is intended to teach a method for attenuating noise in seismic data, particularly but not limited to biological noise, the method being efficient in terms of computer processing requirements.

Figure 1:
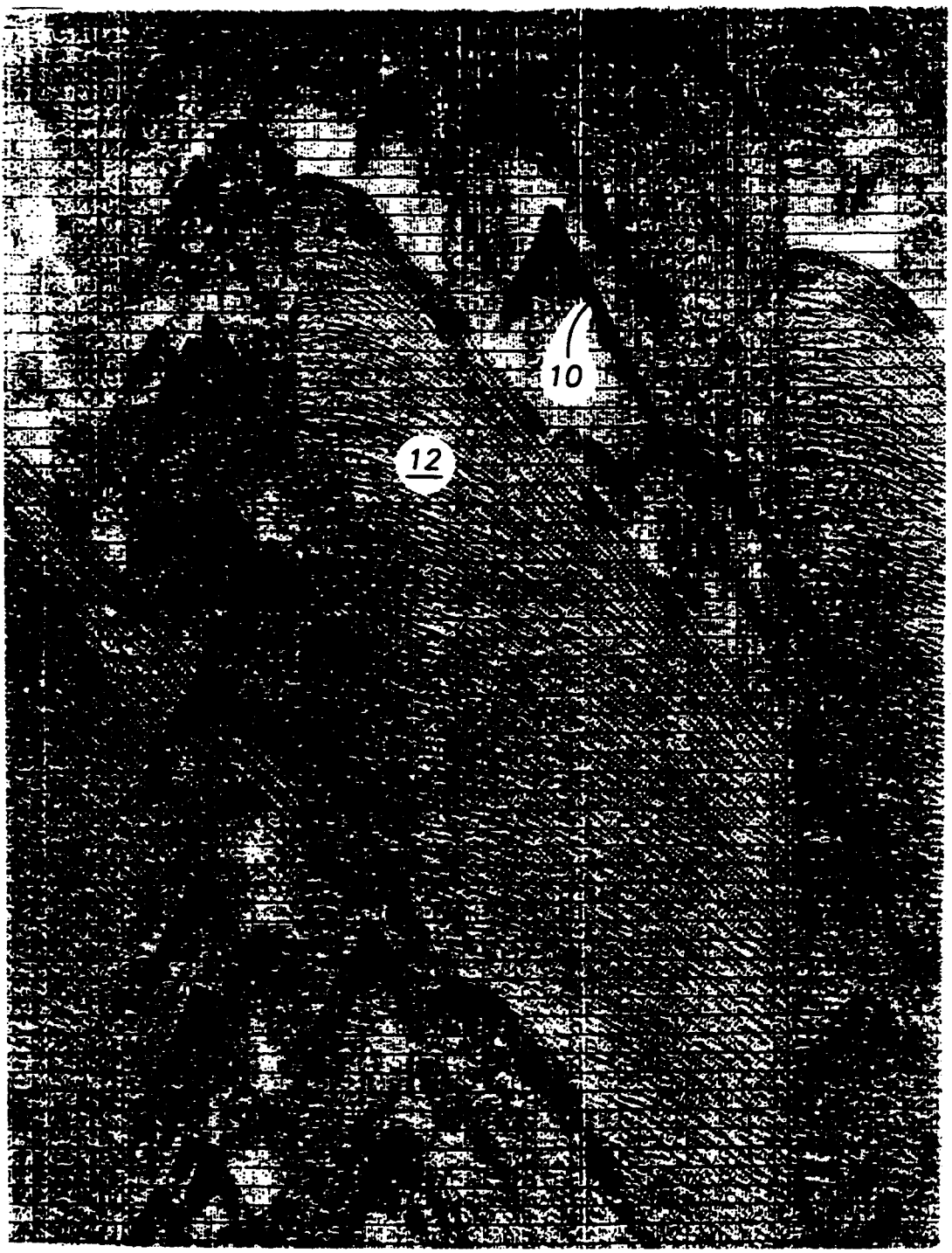
FIG. 1 is an example of biological noise.
Figure 2:
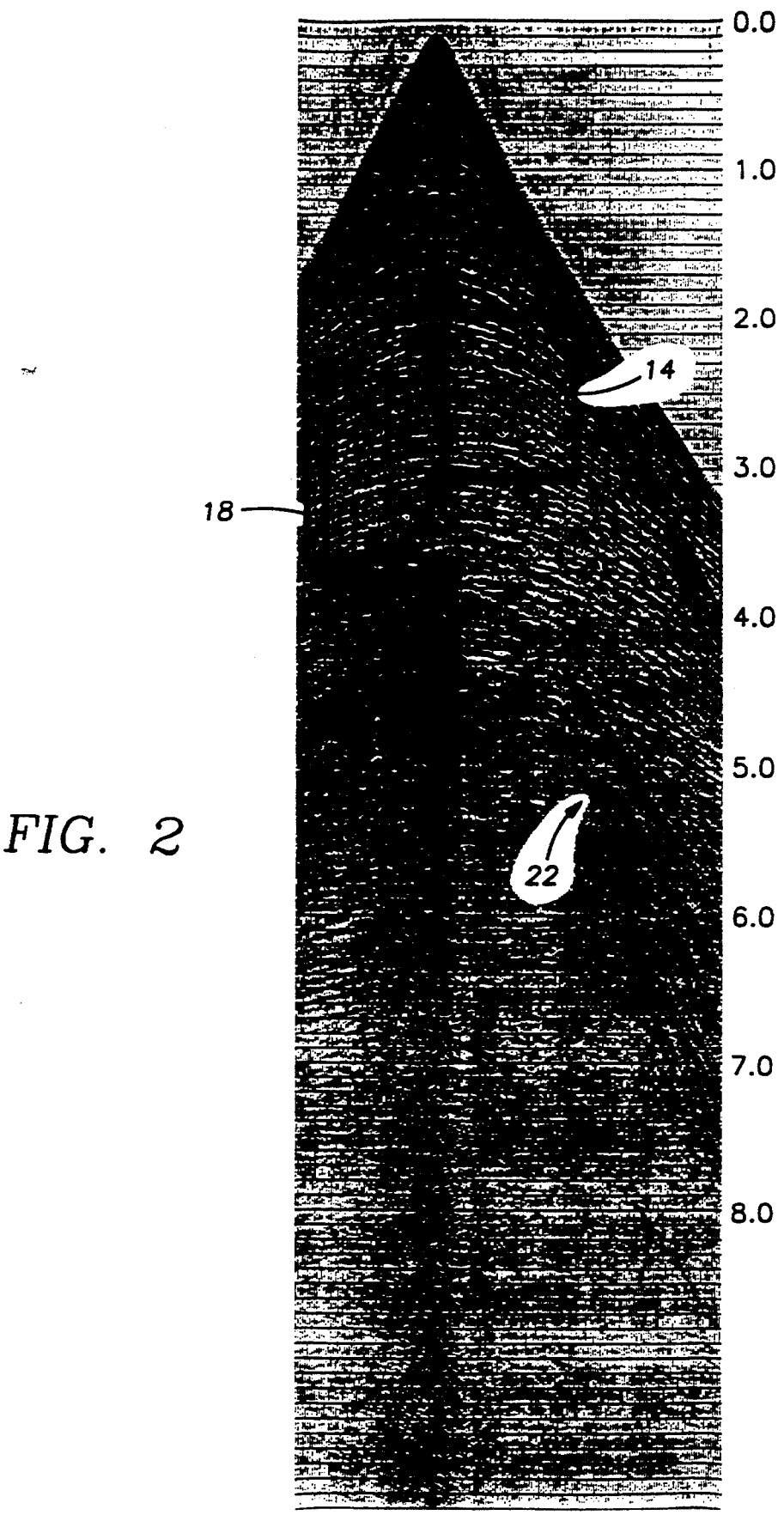
FIG. 2 is a seismic recording of a raw common hydrophone-receiver gather.
Figure 3:
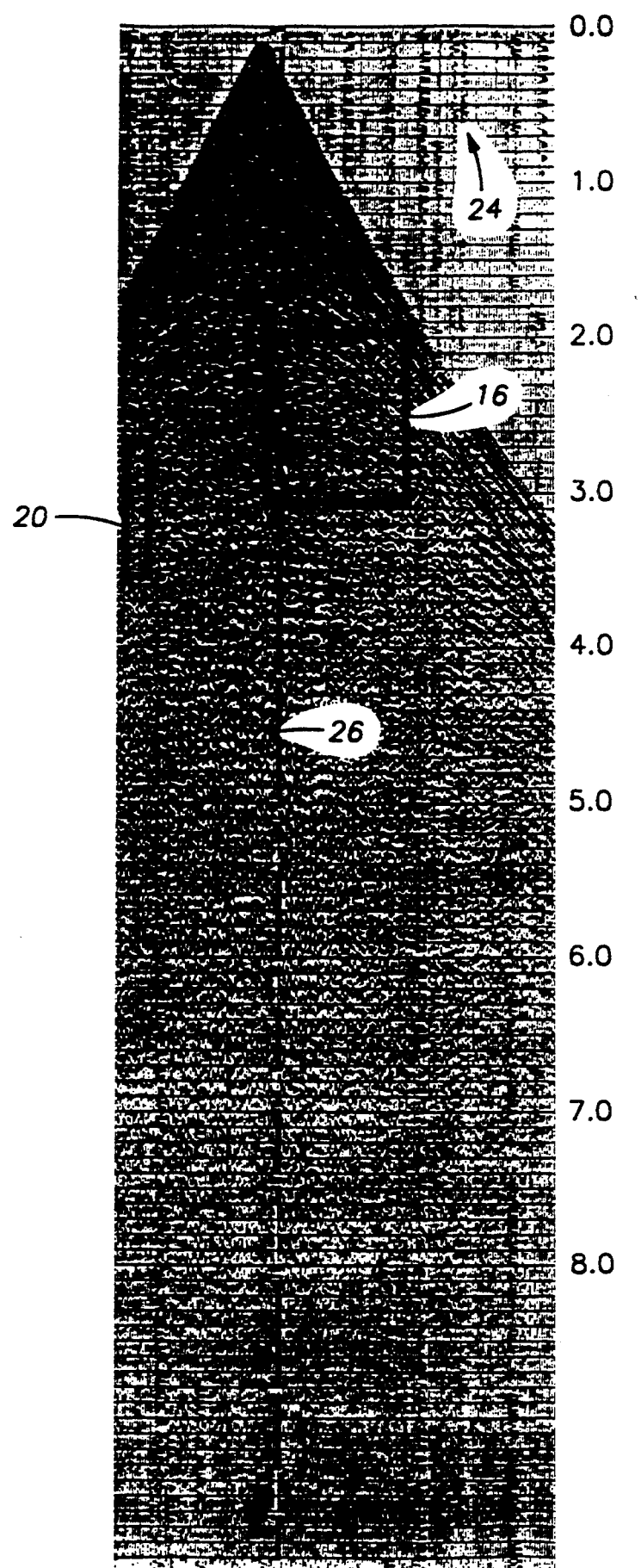
FIG. 3 is a seismic recording of a raw common velocity-receiver gather.

FIG. 2 is a display of a common pressure-receiver (hydrophone) gather, H, while FIG. 3 is a display of a common velocity-receiver (geophone) gather, G. In the Figures, the vertical axis is two-way reflection time in seconds and the horizontal axis is the lateral-sensor separation which was 25 meters between traces. Throughout this text, the term "velocity receiver" or "velocity-responsive receiver" will be used interchangeably with "geophone" and "pressure receiver" or "pressure-responsive receiver" will be used interchangeably with "hydrophone". In the context of this disclosure, the term "signature" means the aspect of a waveshape, expressed in terms of a magnitude as a function of time, that makes it distinctive.

Using an iterative summation/auto-correlation technique taught by U.S. patent application Ser. No. 08/101,949, earlier cited and which is incorporated herein by reference, determine the scale factor, k, for scaling the average geophone signal amplitude to the hydrophone signal amplitude. In the absence of other noise abatement processing, the normalized summation of the gathers is $\Sigma(\tau) = \frac{1}{2}(H + k*G)$.

The method for determining the scale factor, k, may be summarized as follows: The hydrophone pressure signature is filtered to create a best estimate of a geophone velocity signature. The estimated geophone velocity signature is subtracted from the real geophone velocity signature plus embedded noise to yield a nearly pure noise signature. Now, the noise signature is subtracted from the real geophone velocity signature to provide a clean geophone velocity signature. A scale factor is iteratively applied to the clean geophone velocity signature, summed with the hydrophone pressure signature and auto-correlated. A measure of the scale factor is suitably determined from a study of the main lobe and the first side lobes of the autocorrelation trace. The iteration progresses until a suitability measure is maximized.

Within a fixed analysis window such as 14 from the hydrophone traces of FIG. 2, the detected pressure signatures are grouped together to form a first, common hydrophone gather. Within a fixed analysis window 16 from the velocity-receiver traces of FIG. 3, the geophone signatures are grouped together to form a second, common geophone gather. The measured average trace amplitudes of the geophone signals relative to the hydrophone signals in the fixed analysis window are used to define the ratio $R_1$.

The fixed analysis window is established over a selected lateral and temporal region, preferably from a portion of the recordings that is common to both gathers but a portion which is representative of the signal level of the gathers taken as whole. The dimensions of the analysis windows is arbitrary. In the case of FIGS. 2 and 3, the analysis window extends from about 2.0 to about 3.0 seconds vertically and embraces about fifty traces laterally for each gather.

For the next step, the two gathers are partitioned into weighting-zone windows such as 18 and 20 of FIGS. 2 and 3 and which are common to both gathers. The weighting-zone windows have restricted dimensions and may be one to five traces wide and of some arbitrary length such as 0.25, 0.50 or 1.5 seconds. The dimensions depend upon the desired noise-abatement resolution. Within each weighting-zone window, compute the hydrophone-to-geophone amplitude ratio $R_{2i}$ from the average amplitudes of the pressure signals $H_i$ and the velocity signals $G_i$ within the weighting-zone windows for each gather (i is a running scan index as explained below).

In operation, the weighting-zone window is stepped through the respective gathers both spatially (laterally) and temporally (vertically) until the entirety of each gather has been scanned. Thus there is a single value for $R_1$ but an array of values for $R_{2i}$, a new value being computed for each scan, i, where $i = 1, \ldots, n$ and n is an arbitrary number of scans. Thus, for the first scan, the hydrophone to geophone ratio would be $R_{2,1}$ and the equalization operator for that scan is $m_1$.

An equalization operator, $m_i$ for each scan, is computed from $$m_i = R_1 * R_{2i}. \qquad (1)$$

A noise-free time-scale datum $f(\tau)$ is obtained by combining the signatures in the common hydrophone receiver weighting zone with the scaled signatures in the common velocity receiver weighting zone in the presence of the equalization operator as follows:

$$f(\tau_i) = (H_i + k*G_i*m_i) \div (1 + m_1). \qquad (2)$$

Figure 4:
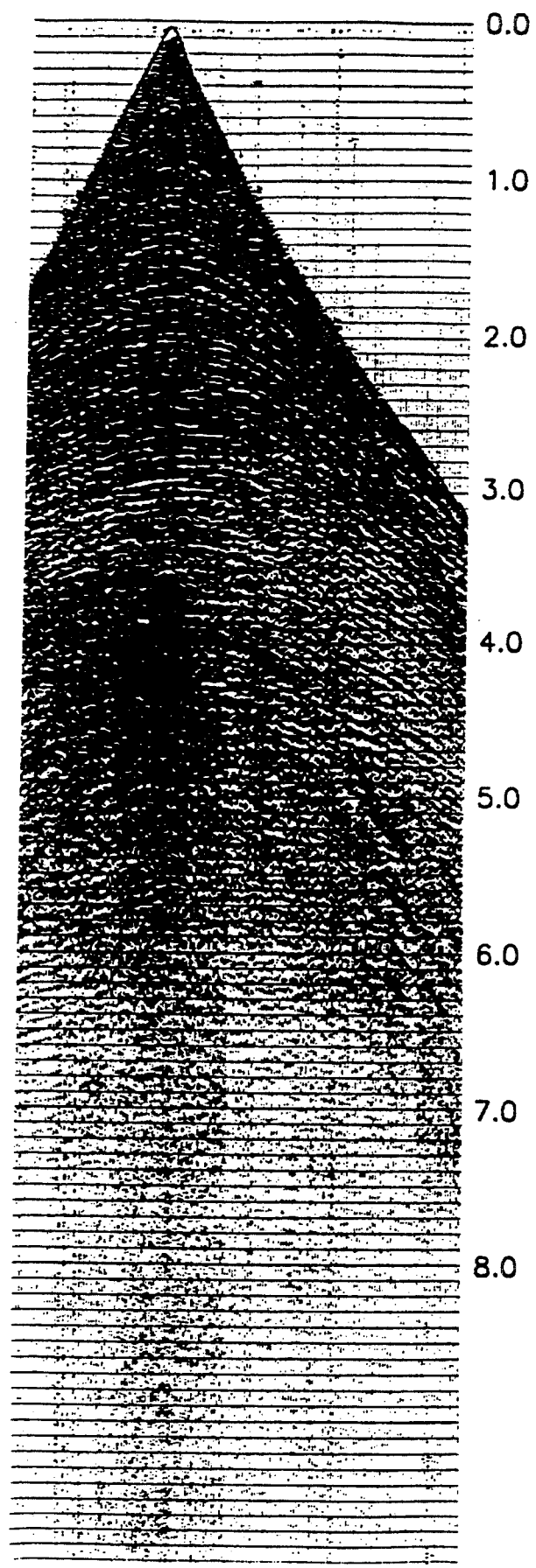
FIG. 4 is the seismic recording after processing the recordings of FIGS. 2 and 3 in accordance with the teachings of this invention.

FIG. 4 is the result of the application of (2) to the summation of the data from FIGS. 2 and 3. The noise bursts 22 seen on FIG. 2 and particularly, the noisy traces such as 24 and 26 on FIG. 3 have been substantially reduced in FIG. 4.

In some applications, the equalization operator may be raised to a power such as $m_i^2$ to accommodate the method to respond to rapid changes in signal amplitude.

The best mode of operation may be demonstrated by hypothetical numerical examples as follows: Assume by way of a first example, that the scale factor, k, as determined by the method of application Ser. No. 08/101,949, previously cited, is 1.5. For the fixed analysis window, it was found that $R_1=2.0$. In a selected weighting zone window, $i=x$, $R_{2x}$ was found to be 0.5. Entering those quantities into (2) above, $f(\tau_x)$ turns out to be $0.5(H+1.5G)$, the same as a normalized, noise-free summation $\Sigma(\tau)$. Thus, for scan $i=x$, neither the hydrophone gather nor the geophone gather saw a noise burst within the xth scan region.

For scan $i=y$, as a second example, $R_1=2.0$ as before and $R_{2y}=5.0$, that is, the hydrophone gather saw a noise transient having an amplitude of ten times over that for scan x. For this case, $$f(\tau_y)=(H_y/11)+1.5*(10/11)G_y.$$

The noise transient in the hydrophone weighting zone for the yth scan contributes only about 0.1 times as much to the sum as does the geophone trace.

In a final example, for scan $i=z$, $R_1$ is 2.0 but $R_{2z}=0.05$. The geophone trace in that weighting zone received a noise transient whose amplitude is ten times greater than normal. For the case of scan $i=z$, $$f(\tau_z)=(H_z/1.1)+1.5*(0.1/1.1)G_z.$$

Thus, the effect of the noise transient on the geophone trace in the zth geophone weighting zone is minimized.

These teachings herein preferably may be implemented by use of any commercial general purpose computer of a type ordinarily used for processing of seismic data, the computer including an adequate memory and an arithmetic processor which may be resident in the CPU in the form of a subroutine or it may be a peripheral such as an array processor.

This invention has been described with a certain degree of specificity by way of example but not by way of limitation. The invention herein disclosed is limited only by the appended claims.

What is claimed is:

1. A method for adaptively suppressing undesired singular transients from time-scale recordings of seismic signals detected concurrently by a plurality of co-located velocity-responsive and pressure-responsive co-sensors, comprising:
    a) generating a reflected seismic wavefield in a moisture-laden environment for detection by said pressure-responsive and velocity-responsive co-sensors to provide hydrophone and geophone time-scale signatures;
    b) defining a scale factor, k, for scaling the geophone signatures to conform to the hydrophone signatures in amplitude;
    c) grouping the detected signatures from said pressure-responsive sensors to form a common hydrophone gather, grouping the detected signatures from said velocity-responsive sensors to form a common geophone gather;
    d) defining a fixed analysis window common to both gathers;
    e) defining a ratio $R_1$ between the common geophone gathers and the common hydrophone gathers within said fixed analysis window;
    f) partitioning the common hydrophone and the common geophone gathers into a plurality of common weighting zones;
    g) within a first weighting zone, defining a ratio $R_{2,1}$ between the hydrophone signatures and the geophone signatures;
    h) forming an equalization operator, $m_1$, from a combination of $R_1$ and $R_{2,1}$;
    i) combining the hydrophone signatures in the common hydrophone weighting zone with the scaled geophone signatures in the common geophone weighting zone in the presence of said equalization operator to define a transient-free time-scale datum $f(\tau)$.

2. The method as defined by claim 1, comprising: repeating steps g–i for the remainder of the weighting zones.

3. The method as defined by claim 2, wherein: said equalization operator is calculated from $m_i = R_1 * R_{2i}$.

4. The method as defined by claim 2, wherein: said equalization operator is calculated from $m_i{}^n = (R_1 * R_{2i})^n$, where n is an integer $\geq 1$.

5. The method as defined by claim 4 wherein: step i) is implemented by the formulation $f(\tau)=(H_i+k*G_i*m_i)/(1+m_1)$ where $H_i$ represents the common hydrophone-gather data and $k*G_i$ represents the scaled common geophone-gather data within a weighting zone window.

6. A noise abatement method for attenuating singular transients in seismic signals, comprising:
    receiving pressure-responsive seismic signals and velocity-responsive seismic signals and formatting the received seismic signals into a common pressure-signal gather, H, and a common velocity-signal gather, G, respectively;
    establishing a fixed analysis window over a region having selected spatial and temporal dimensions common to both said gathers and within said window, determining the average amplitude ratio $R_1$ between the velocity-signal gather G and the pressure signature gather H;
    partitioning the respective gathers into a plurality of common weighting zones having restricted lateral and temporal limits;
    within each weighting zone determining the ratio $R_{2i}$ between the average amplitude of the pressure-signal gather $H_i$ and the velocity-signal gather $G_i$, i being a scan index;
    combining $R_1$ and $R_{2i}$ to form an equalization operator $m_i$;
    defining a transient-free time-scale datum $f(\tau_i)$ within each weighting zone window by summing the pressure-signal $H_i$ gather with the scaled velocity-signal gather $k*G_i$ in the presence of the equalization operator $m_i$.

* * * * *